United States Patent [19]

Kaplan et al.

[11] Patent Number: 4,640,413
[45] Date of Patent: Feb. 3, 1987

[54] UNIVERSAL PACKAGE FOR PRERECORDED COMPUTER DISK AND ASSOCIATED INSTRUCTIONAL MATERIAL

[75] Inventors: Gary M. Kaplan; Robert T. Karau, both of Eugene; Norman E. Winney, Jr., Springfield; David G. Brader, Eugene, all of Oreg.

[73] Assignee: Communications Transfer Corp., Eugene, Oreg.

[21] Appl. No.: 739,824

[22] Filed: May 31, 1985

[51] Int. Cl.⁴ .................. B65D 27/30; B65D 85/57
[52] U.S. Cl. .................. 206/232; 206/444; 206/312; 229/68 R
[58] Field of Search .......... 206/232, 312, 444, 387, 206/450, 831, 214; 229/68 R, 71, 72

[56] References Cited

U.S. PATENT DOCUMENTS

| | | | |
|---|---|---|---|
| 1,677,770 | 7/1928 | Harnsberger | 206/232 |
| 1,859,631 | 5/1932 | Osborn | 206/215 |
| 1,931,351 | 10/1933 | Jenrich | 229/72 |
| 2,306,726 | 12/1942 | Hasin | 206/312 |
| 2,390,864 | 12/1945 | Bayley | 206/214 |
| 2,681,175 | 6/1954 | David | 229/71 |
| 3,522,907 | 8/1970 | Utterback, Jr. | 206/312 |
| 3,561,671 | 2/1971 | Minot, Jr. | 229/68 R |
| 3,606,135 | 9/1971 | Rosenburg, Jr. | 206/831 |
| 3,722,564 | 3/1973 | Croon | 206/312 |
| 3,870,223 | 3/1975 | Wyant | 206/215 |
| 4,420,112 | 12/1983 | Cline | 206/215 |
| 4,508,366 | 4/1985 | Brindle | 206/309 |
| 4,549,658 | 10/1985 | Sfikas | 206/444 |

FOREIGN PATENT DOCUMENTS

| | | | |
|---|---|---|---|
| 67656 | 3/1947 | Denmark | 229/68 |
| 1050913 | 1/1954 | France | 206/312 |
| 346071 | 4/1931 | United Kingdom | 229/68 R |
| 2141998 | 1/1985 | United Kingdom | 206/444 |

Primary Examiner—William Price
Assistant Examiner—Brenda J. Ehrhardt
Attorney, Agent, or Firm—Chernoff, Vilhauer, McClung & Stenzel

[57] ABSTRACT

The package of the present invention is comprised of a unitary blank which forms a folder for carrying a computer disk having a program or series of programs recorded on it and an instruction book relating to that program or series of programs. The folder has a closed pocket in its rear portion which encapsulates the disk and prevents it from being removed from the folder without cutting a slot in the folder or destroying it. The front portion of the folder has an open pocket which receives the cover of the instruction book and has openings in it which overlie identifying indicia printed on the cover of the book so that the indicia can be seen through the folder. Thus the same folder can be used to package disks embodying a wide variety of programs.

7 Claims, 5 Drawing Figures

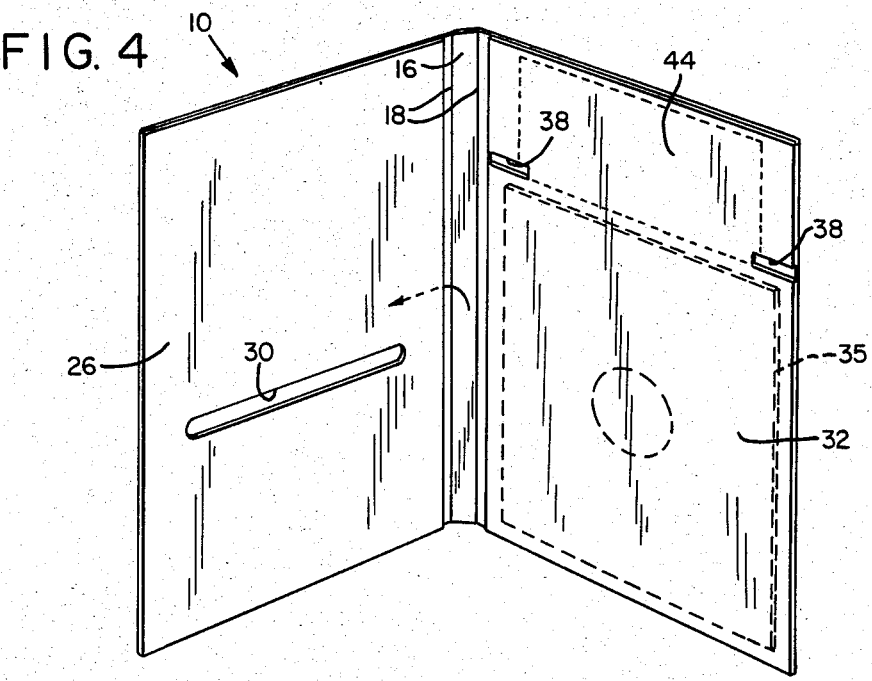
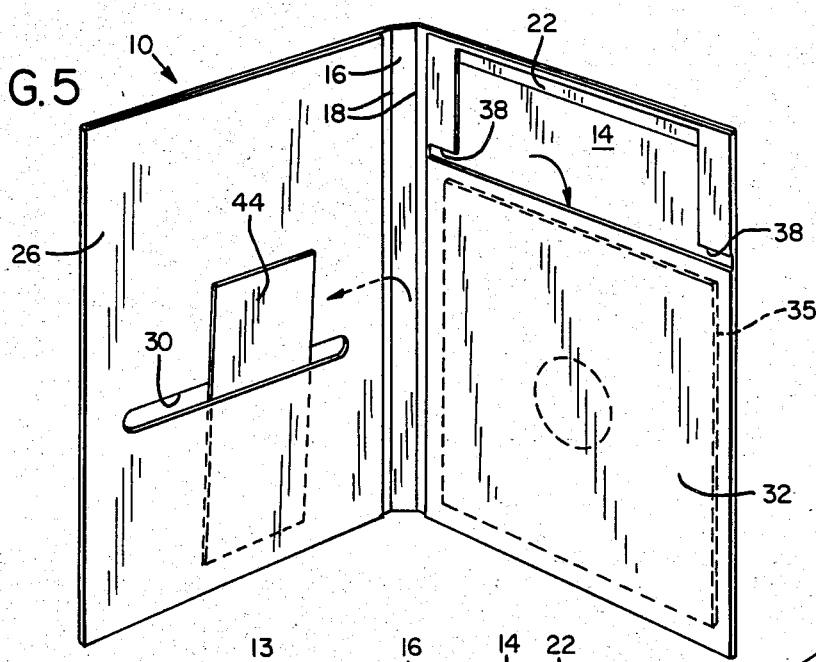
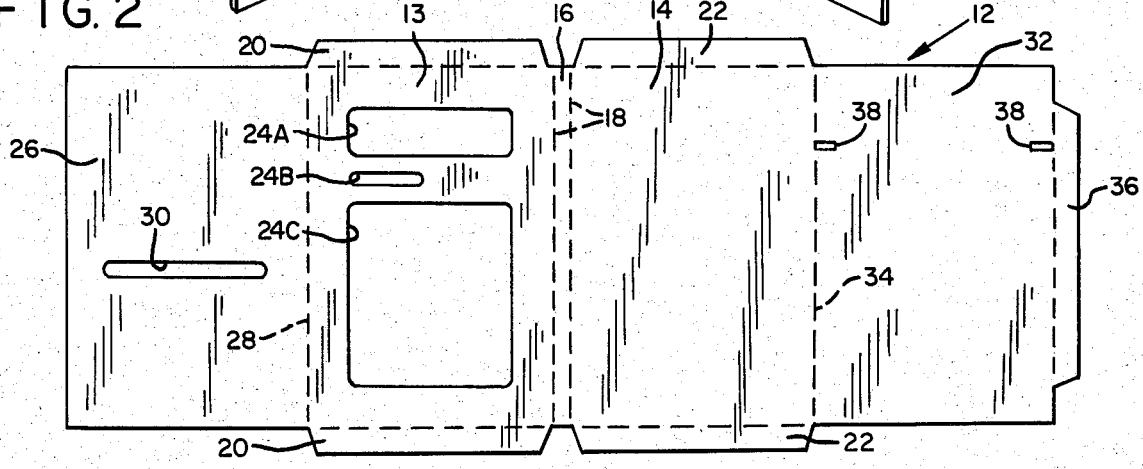

4,640,413

UNIVERSAL PACKAGE FOR PRERECORDED COMPUTER DISK AND ASSOCIATED INSTRUCTIONAL MATERIAL

BACKGROUND OF THE INVENTION

This invention relates to a package of the type where a prerecorded computer disk and an instruction manual are sold in a cardboard folder, and in particular to such a package wherein disks having different programs recorded on them can be sold in the same folder.

As computer programs on prerecorded disks have become more prevelant, the cost of the programs has been reduced. As a result, such programs commonly are sold in lightweight cardboard folders which act as receptacles for storing the disks along with their associated intructional manuals. However, a software producer typically will sell a wide variety of different programs, thereby requiring the printing of many different folders. Not only does this increase the printing cost, but it also requires that a large inventory of folders must be stocked in order to insure that there always are folders on hand for every program. Also, care must be taken to insure that every disk is inserted into an appropriate folder.

In addition, when the software is sold from an unsecured display rack in folders of this type, which typically are sealed merely by enclosing them in shrink-wrap, it has been found that people often will open a package in the store, remove the disk from it, and then steal the disk. Since shrink-wrap can quickly and easily be removed, such packaging makes the disk readily accessible for this purpose.

SUMMARY OF THE INVENTION

The present invention overcomes the shortcomings and limitations of the prior art computer software packages by providing a folder, formed from a unitary blank, which is divided into a front segment having an open pocket located in it, and a rear segment having a closed pocket located in it. The computer disk is placed into the closed pocket when the folder is being formed from the blank. Thus the disk is encapsulated in the closed pocket and cannot be removed without destroying the folder.

The inside cover of the rear segment has slots formed in it, however, which receive the tip of a scissors blade, thereby allowing the purchaser to open the closed pocket, and thus remove the disk without destroying the folder. As a result, the folder can be used as a receptacle for storing the disk when it is not being used.

Rather than printing the material that identifies the particular program, or series of programs, recorded on the disk on the folder itself, this indicia is printed at selected locations on the cover of an instruction book which is associated with that particular program or series of programs. The outer cover of the front segment of the folder has openings located in it which are arranged to overlie the printed material on the cover of the book when the cover is inserted into the open pocket. Thus, the printed material can be seen through the folder thereby allowing the same folder to be used for a large number of programs.

Accordingly, it is a principal object of the present invention to provide a package for prerecorded computer disks from which the disk cannot easily be removed.

It is a further object of the present invention to provide such a package which has a pocket in which the disk can be stored once the package has initially been opened.

It is a further object of the present invention to provide such a package having a universal disk folder which can be used for a large number of disks having different programs recorded on them.

The foregoing and other objectives, features and advantages of the present invention will be more readily understood upon consideration of the following detailed description of the present invention, taken in conjunction with the accompanying drawings.

BRIEF DESCRIPTION OF THE DRAWINGS

FIG. 2 is a plan view of the blank which is used to form a folder which is an element of the present invention.

FIG. 4 is a perspective view showing the folder completely assembled.

FIG. 5 is a perspective view showing the folder after it has been opened to remove the computer disk carried by it.

DETAILED DESCRIPTION OF A PREFERRED EMBODIMENT

Figure 1:
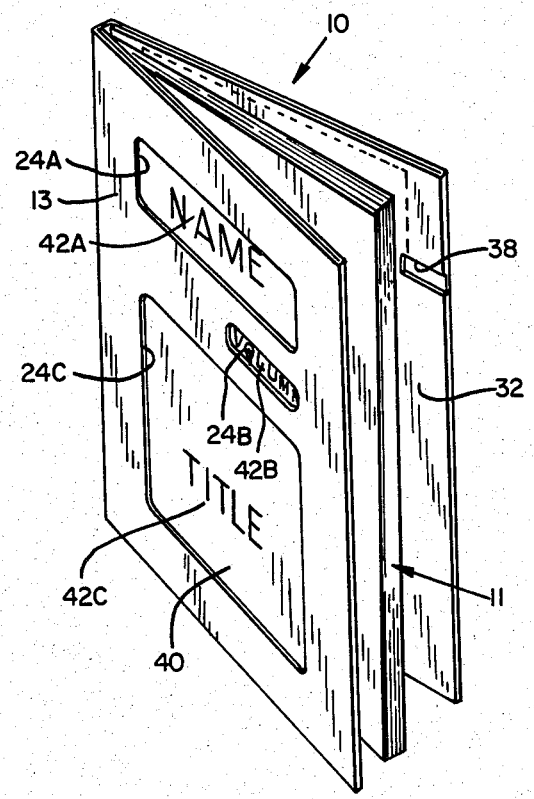
FIG. 1 is a perspective view of a package for computer software embodying the features of the present invention.

Referring to FIG. 1 of the drawings, the package of the present invention generally comprises a folder 10 and an instruction book 11 which is carried in the folder. The folder is formed from a unitary blank 12, shown in FIG. 2, which preferably is made from lightweight cardboard of the type which typically is used for this class of packaging. The blank has four basic sections which are similarly sized and are separated from one another by means of fold lines. Located in the center of the blank are a front panel 13 and a rear panel 14. The two panels are the same size and are separated from one another by a narrow back element 16. Fold lines 18 are located between the back element and each of the panels.

Attached to the sides of the front panel which are adjacent to the fold lines 18 are narrow first flaps 20. Similar second flaps 22 are attached to the sides of the rear panel 14. Openings 24 are placed at selected locations in the front panel. The size and position of these openings will be explained more fully later.

Located outwardly of the front panel 13 is an inner cover portion 26. The inner cover portion has the same height as the front panel but is not quite as wide. A fold line 28 separates the front panel and the inner cover from one another. A window 30 is located medially in the inner cover portion 26.

Located outwardly of the rear panel 14 is a pocket portion 32. The pocket portion has the same height as the rear panel but is slightly narrower. The rear panel is separated from the pocket portion by a fold line 34. Located outwardly of the pocket portion 32 is a flap 36 which is similar to flaps 20 and 22. Slots 38 are positioned at the sides of the pocket portion with one slot being located adjacent to the fold line 34 and the other slot being located adjacent to the flap 36.

Figure 3:
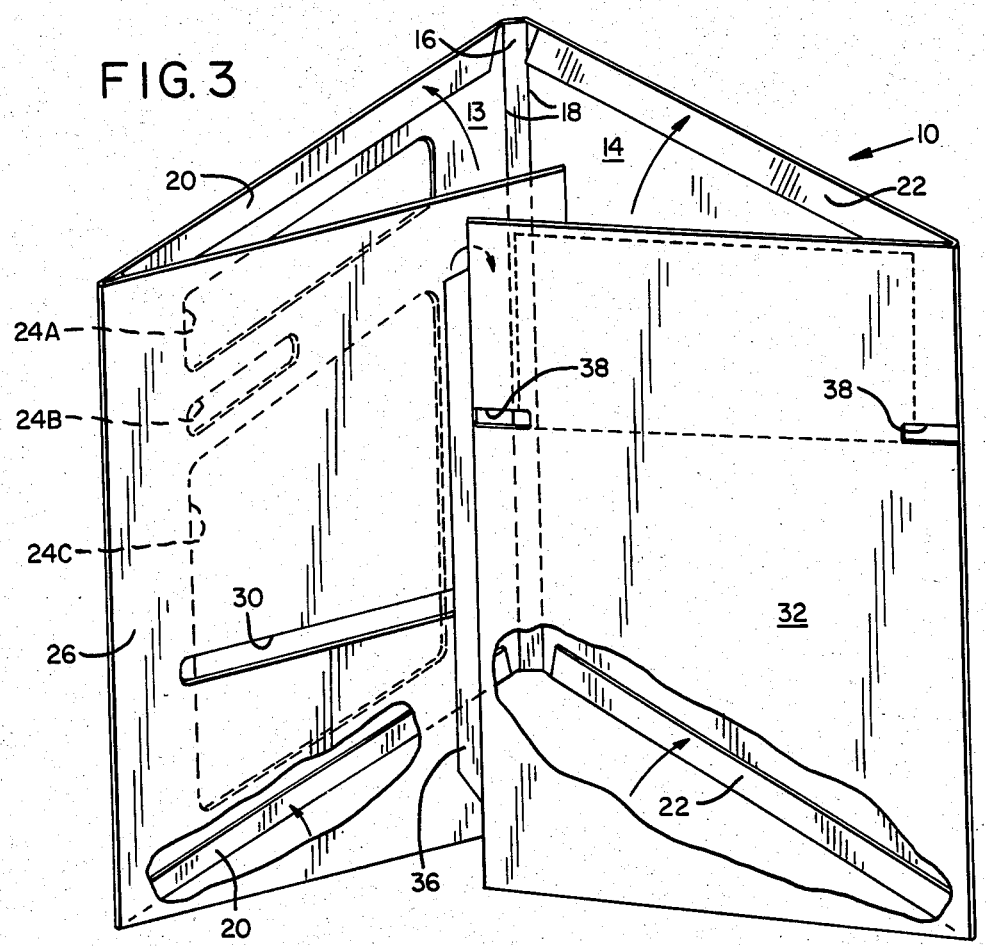
FIG. 3 is a perspective view, partly broken away, showing the blank partially assembled.

Referring now to FIG. 3, the folder 10 is constructed by folding the first flaps 20 downwardly and folding the inner cover inwardly toward the front panel 13 on the fold line 28. The front panel then is attached to the first flaps by means of a suitable adhesive to form an open pocket. Similarly, the second flaps 22 and the flap 36 are folded inwardly and the pocket portion 32 is folded over them about the fold line 34. The pocket portion then is attached to the flaps 22 and 36 to form a closed pocket which carries a prerecorded computer disk 35, FIGS. 4 and 5. The disk is inserted into the closed pocket before the pocket portion is glued to the flaps and therefore it becomes completely encapsulated and cannot be removed without opening the folder in the manner described below or completely destroying it.

Once the folder 10 is formed, the front cover 40 of the instruction book 11 is inserted into the open pocket as shown in FIG. 1. The front cover of the book is rigid in order to support the book in the pocket, preferably being constructed from a cardboard similar to that used for the blank 12. Printed on the cover is identifying indicia 42 which relates to the particular computer program or programs described in the book and recorded on the disk carried in the folder. If an instruction book is not provided with the software, the identifying indicia can be printed on a sheet (not shown) having the same size as the cover of the book. In the preferred embodiment a brand name is printed at 42A, and shows through a medium-sized opening 24A, a volume number is printed at 42B, and shows through a smaller opening 24B and a program title or titles is printed at 42C and shows through a large opening 24C. In addition, an insert sheet, not shown, can be placed in the open pocket behind the cover 40 so that explanatory material located on the sheet can be seen through the window 30 in the inner cover 26. The entire package then is sealed in shrink-wrapped material as is done with the prior art packages.

The folder 10 is opened to remove the computer disk by inserting one of the blades of a pair of scissors into the slots 38 in the pocket portion 32 and cutting out the segment 44 defined by the dashed lines in FIG. 4. It is important that the disk is positioned at the bottom of its pocket before the pocket portion is cut. If desired the segment 44 can be a coupon or proof of purchase seal in which case it can be placed in the window 30 as shown in FIG. 5 for later use. Once cut, the pocket can serve as a pouch in which the disk can be stored when it is not in use.

As is apparent from the foregoing description, the folder 10 of the present invention can be utilized with an infinite number of different computer programs since the name of the program is printed on the instruction book 11 that is associated with that program in a manner such that it can be seen through the openings 24 in the front panel 13. Thus, printing and inventory costs are greatly reduced compared to normal computer software packages. In addition, the package of the present invention makes it difficult to remove the computer disk from the package and steal it from the store in which it is being sold, since the package must be opened in order to remove the disk from it, and this cannot easily be accomplished.

The terms and expressions which have been employed in the foregoing description are used therein as terms of description and not of limitation, and there is no intention in the use of such terms and expressions of excluding equivalence of the feature shown and described or portions thereof, it being recognized that the scope of the invention is defined and limited only by the claims which follow.

What is claimed is:

1. A package for displaying and selling a preprogrammed computer disk comprising:
    (a) a sheet containing printed indicia relating to the particular computer program or series of programs being sold in the package; and
    (b) a folder which is divided into at least two integral segments which are foldable relative to one another between a closed position wherein said sections overlie one another and an open position wherein said sections are disposed side-by-side, said folder including a front segment having an open pocket defined therein which removably receives said sheet and has openings defined therein which are arranged to permit viewing said identifying indicia through said package when said folder is in its closed position, and a rear segment having a closed pocket defined therein encapsulating the computer disk.

2. The package of claim 1, including a book containing instructional material relating to said particular program or series of programs, wherein said sheet comprises the cover of said book.

3. The package of claim 1 wherein said closed pocket completely encapsulates the disk, including means for opening said closed pocket for removal of the disk therefrom.

4. The package of claim 3 wherein said package is formed from a unitary cardboard blank comprising:
    (a) a central portion which is divided into two like-sized sections by a fold line, one of said sections defining the front panel of said package and the other of said sections defining the rear panel of said package;
    (b) an inner cover portion which is hingedly attached to the edge of said front panel which is opposite said fold line;
    (c) a pocket portion which is hingedly attached to the edge of said rear panel which is opposite said fold line;
    (d) means for securing the edges of said inner cover portion to said front panel so as to form said open pocket for receiving said sheet therebetween: and
    (e) means for securing the edges of said pocket portion to said rear panel so as to form said closed pocket for receiving said disk therebetween.

5. The package of claim 4 wherein said means for opening said closed pocket comprises said pocket portion defining slot means for receiving the tip of a scissor blade to facilitate removal of a section of said pocket portion.

6. The package of claim 4 wherein said means for securing the edges of said inner cover portion to said front panel comprises paired first flaps which are located on the opposed edges of said front panel which are adjacent to said fold line.

7. The package of claim 4 wherein said means for securing the edges of said pocket portion to said rear panel comprises paired second flaps which are located on the opposed edges of said rear panel which are adjacent to said fold line and a third flap which is located on the edge of the pocket portion which is opposite of said fold line.

* * * * *